United States Patent Office 3,525,749
Patented Aug. 25, 1970

3,525,749
CERTAIN 1,3-DIOXEPINO-[5, 6-c]-PYRIDINES
Earl M. Chamberlin and Elbert E. Harris, Westfield, and
John L. Zabriskie, Jr., Scotch Plains, N.J., assignors
to Merck & Co., Inc., Rahway, N.J., a corporation of
New Jersey
No Drawing. Filed Mar. 19, 1969, Ser. No. 808,694
Int. Cl. C07d *31/50*
U.S. Cl. 260—294.8          2 Claims

ABSTRACT OF THE DISCLOSURE

Novel intermediates which may be hydrolyzed to Vitamin $B_6$ prepared utilizing novel dioxepins as the dienophile in a Diels-Alder condensation.

BACKGROUND OF THE INVENTION

It is known in the art that Vitamin $B_6$, otherwise known as pyridoxine, may be prepaerd by the condensation of certain oxazoles with certain derivatives of 2-butene-1,4-diol to form a Diels-Alder adduct. This adduct is then converted into the desired pyridoxine.

SUMMARY OF THE INVENTION

An object of the present invention is provision of novel dioxepins which may be utilized with certain oxazoles in a Diels-Alder condensation reaction to form novel pyridoxine intermediates. Another object of the present invention is provision of an improved process for preparing Diels-Alder adducts which are convertible to Vitamin $B_6$. Another object of the present invention is provision of an improved process for preparing Vitamin $B_6$ using novel starting reactants whereby there are obtained high yields of the desired Vitamin.

DESCRIPTION OF THE PREFERRED EMBODIMENT

In accordance with the present invention, an improved process for preparing Vitamin $B_6$ is obtained by reacting suitable oxazoles with novel dienophiles and hydrolyzing the Diels-Alder adduct thus formed. This may be schematically represented as follows:

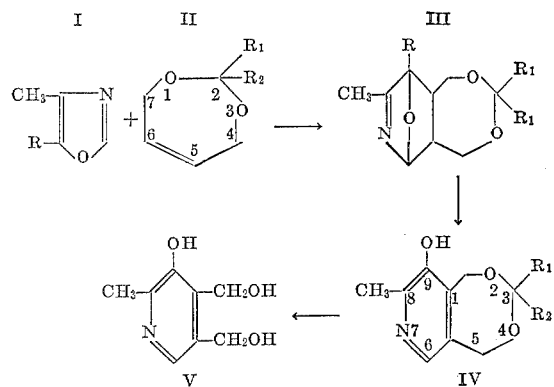

wherein R is cyano or loweralkoxy; $R_1$ represents haloloweralkyl, loweralkoxyloweralkyl or a five membered heterocyclic radical selected from the group consisting of furyl or thiazolyl and the alkyl substituted analogs thereof and $R_2$ is hydrogen or loweralkyl. For purposes of this invention, the terms loweralkyl and loweralkoxy represent a radical having 1–3 carbon atoms. The formulas above have been numbered for convenience only, and other systems and nomenclature may be equally appropriate.

Thus, the novel dienophiles of the present invention (Formula II) when intimately contacted with an oxazole (Formula I) react readily under suitable conditions in a Diels-Alder condensation to form an adduct (Formula III) which may be isolated or upon suitable in situ treatment will collapse to form the intermediate pyridine (Formula IV) which can be hydrolyzed to produce Vitamin $B_6$.

The novel dienophile starting reactants which have been found useful in preparing the substituted pyridines of Formula IV and pyridoxine of Formula V are substituted 4,7-dihydro-1,3-dioxepins. Of this class of compounds, it has been found that the 4,7-dihydro-1,3-dioxepins wherein one of the hydrogens on the carbon in the 2 position is replaced with a furyl, thiazolyl, a haloloweralkyl or a loweralkyl-loweralkoxy substituent or where one of the hydrogens is replaced with one of the aforementioned substituents and a second hydrogen is replaced with a methyl group, constitute especially useful dienophiles for purposes of the present invention. In addition, where one of the aforementioned compounds is a 2-heterosubstituted dioxepin, the heterocyclic moiety may be further substituted with one or more loweralkyl groups and preferably with a methyl group. Representative members of dioxepins embraced by Formula II thus include 2-(2-furyl)-4,7-dihydro-1,3-dioxepin
2-[2(5-methylfuryl)]-4,7-dihydro-1,3-dioxepin
2-(2-furyl)-4,7-dihydro-2-methyl-1,3-dioxepin
2-(2-furyl)-4,7-dihydro-2-methyl-1,3-dioxepin
2-(4-thiazolyl)-4,7-dihydro-1,3-dioxepin
2-[4-(2-methylthiazolyl)]-4,7-dihydro-1,3-dioxepin
2-(4-thiazolyl)-4,7-dihydro-2-methyl-1,3-dioxepin
2-chloromethyl-4,7-dihydro-2-methyl-1,3-dioxepin
2-bromomethyl-4,7-dihydro-2-methyl-1,3-dioxepin
2-(α-chloroethyl)-4,7-dihydro-2-methyl-1,3-dioxepin
2-chloromethyl-4,7-dihydro-1,3-dioxepin
2-(α-chloropropyl)-4,7-dihydro-1,3-dioxepin
2-methoxymethyl-4,7-dihydro-1,3-dioxepin
2-ethoxymethyl-4,7-dihydro-1,3-dioxepin
2-(β-methoxyethyl)-4,7-dihydro-1,3-dioxepin
2-(α-methoxyethyl)-4,7-dihydro-1,3-dioxepin Of the aforementioned dioxepins, the 2-chloroloweralkyl and particularly 2-chloromethyl-4,7-dihydro-1,3-dioxepins and 2-chloromethyl-4,7-dihydro-2-methyl-1,3-dioxepins are especially useful in preparing the intermediates of Formula IV.

The dioxepin starting reactants used in preparing the dioxepinopyridine compounds of Formula IV are prepared by reacting an aldehyde or ketone with cis-2-butene-1,4-diol. Thus, the novel 2-heterosubstituted dioxepins of the present invention are prepared by reacting in an inert solvent in the presence of a catalytic amount of acid, equimolar amounts of cis-2-butene-1,4-diol with furfural or thiazole-4-aldehyde, or the methyl analogs thereof in which case the corresponding 2-heterosubstituted-4,7-dihydro-1,3-dioxepin is obtained. The 2-haloloweralkyl and 2-haloloweralkyl-2-methyl and 2-loweralkoxyloweralkyl and 2-loweralkoxyloweralkyl-2-loweralkyl - 4,7 - dihydro-1,3-dioxepins are prepared by reacting in a similar manner cis-2-butene-1,4-diol with an appropriately substituted aldehyde or ketone. Accordingly, monochloroacetone and α-chloroethylmethylketone affords 2 - chloromethyl-2-methyl and 2-(α-chloroethyl)-2-methyl-4,7-dihydro-1,3-dioxepin respectively and chloroacetaldehyde and methoxyacetaldehyde affords 2-chloromethyl and 2-methoxymethyl-4,7-dihydro-1,3-dioxepin respectively.

The novel dioxepins represented by Formula II may be used in preparing the substituted dioxepinopyridines of Formula IV by reaction with, and in the presence of an acid binding agent, a 4-methyl-5-loweralkoxy oxazole or a 4-methyl-5-cyano oxazole. After completion of the reaction, the acid binding agent is removed as a residue by filtration and the unreacted oxazole and dienophile distilled under reduced pressure. At this point, the adduct of Formula III, if desired, may then be isolated by distillation at high vacuum and converted to the substituted pyridine of Formula IV under optimum conditions or the crude adduct may be treated in situ with acid in order to cleave it.

The reaction times and temperatures utilized to bring about the formation of the desired Diels-Alder adduct will depend to a great extent upon the dienophile employed. Typically, however, the reaction may be suitably effected at a temperature of about 90–180° C., preferably at about 125–135° C., for a period of about 3–60 hours, preferably for about 20–52 hours.

In addition, it has been found that the yield of adduct is further increased for agitating the components during the reaction period.

The quantity of the acid binding agent utilized in the reaction is also not believed to be critical. Accordngly, quantities ranging from about 1–15 percent by weight of the total amount of reactant appears to give satisfactory results, although 1–3 percent have been found to be sufficient in most cases.

As to the acid binding agent, any agent capable of removing or inactivating traces of acid that may be formed as a by-product during the Diels-Alder reaction and which does not adversely react with either the diene, the dienophile, or the adduct, under the reaction conditions, is suitable. Accordingly, the acid binding agent may include such agents as bases; epoxides, exemplified by cyclohexene oxide; and molecular sieves, for example, Linde Type 4A; or calcium carbide. The bases that may be employed as acid binding agents in this process may be organic or inorganic bases, although the inorganic bases have been found most desirable. Thus, suitable inorganic bases include Group 1–A carbonates and bicarbonates, such as sodium carbonate, potassium carbonate and sodium bicarbonate; Group I–B oxides, such as copper oxide and silver oxide; Group II–A oxides and hydroxides, such as magnesium hydroxide, calcium hydroxide, strontium hydroxide, and barium hydroxide, as well as their corresponding carbonates and bicarbonates; Group II–B oxides such as zinc oxide, cadmium oxide and their corresponding carbonates; and aluminum and silicon oxides. Among the preferred materials are calcium oxide, magnesium oxide and calcium carbonate, as well as calcium carbide and molecular sieves (Linde Type 4A). Of all of these materials, calcium oxide appears most satisfactory from a commercial point of view.

Representative examples of the substituted dioxepinopyridines of Formula IV prepared in accordance with the present invention include the following:

3-[2-(5-methylfuryl)]-1,5-dihydro-8-methyl[1,3]dioxepino[5,6c]pyridin-9-ol
3-(2-furyl)-1,5-dihydro-3,8-dimethyl[1,3]dioxepino[5,6c]pyridin-9-ol
3-(4-thiazolyl)-1,5-dihydro-8-methyl[1,3]dioxepino[5,6c]pyridin-9-ol
3-[4-(2-methylthiazolyl)]-1,5-dihydro-8-methyl[1,3]dioxepino[5,6c]pyridin-9-ol
3-(4-thiazolyl)-1,5-dihydro-3,8-dimethyl[1,3]dioxepino[5,6c]pyridin-9-ol
3-chloromethyl-1,5-dihydro-3,8-dimethyl[1,3]dioxepino[5,6c]pyridin-9-ol
3-bromomethyl-1,5-dihydro-3,8-dimethyl[1,3]dioxepino[5,6c]pyridin-9-ol
3-(α-chloroethyl)-1,5-dihydro-3,8-dimethyl[1,3]dioxepino[5,6c]pyridin-9-ol
3-chloromethyl-1,5-dihydro-8-methyl[1,3]dioxepino[5,6c]pyridin-9-ol
3-(α-chloropropyl)-1,5-dihydro-8-methyl[1,3]dioxepino[5,6c]pyridin-9-ol
3-methoxymethyl-1,5-dihydro-8-methyl[1,3]dioxepino[5,6c]pyridin-9-ol
3-ethoxymethyl-1,5-dihydro-8-methyl[1,3]dioxepino[5,6c]pyridin-9-ol
3-methoxyethyl-1,5-dihydro-8-methyl[1,3]dioxepino[5,6c]pyridin-9-ol The novel dioxepinopyridines of Formula IV may be converted to Vitamin $B_6$ according to methods known in the art.

Thus, according to the present invention, there is provided a method for preparing Vitamin $B_6$ in high yields from inexpensive starting materials.

EXAMPLE 1

Preparation of 3-(2-furyl)-1,5-dihydro-8-methyl[1,3]dioxepino[5,6-c]pyridin-9-ol A mixture of 22 g. (0.173 m.) of 5-ethoxy-4-methyl oxazole, 433 g. (2.6 m.) of 2-(2-furyl)-4,7-dihydro-1,3-dioxepin, and 19.35 g. of calcium oxide was stirred under nitrogen at 130° C. for 23 hours. The reaction mixture was filtered and stripped free of unreacted oxazole and dioxepin under reduced pressure. The residue obtained was dissolved in ethylacetate such that 3 cc. of stock solution should contain 1.005 g. of adduct III calculated on oxazole consumed. A 3 cc. aliquot of this solution was concentrated to dryness and the resulting residue, in 25 cc. of glacial acetic acid, was heated to 33° for 4 hours to form 3-(2-furyl)-1,5-dihydro-8-methyl[1,3]dioxepino[5,6-c]pyridin-9-ol.

Preparation of 2-heterosubstituted-4,7-dihydro-1,3-dioxepins 2-(2-furyl)-4,7-dihydro-1,3-dioxepin was prepared by the reaction of 440.5 g. (5 moles) of cis-2-butene-1,4-diol and 482 g. (5 moles) of furfural in 750 cc. of benzene containing 123 mg. of p-toluenesulfonic acid. The reaction mixture was heated at reflux for 24 hours to give 89 cc. (99%) of water collected in a Dean-Stark trap. The benzene was removed under reduced pressure and the residue fractionally distilled at 0.15 mm. to give 700 g. of 2-(2-furyl)-4,7-dihydro-1,3-dioxepin boiling at 57° C.

By substituting in the foregoing procedure, 4-methylfurfural and 5-ethylfurfural for furfural, there is obtained respectively 2-[2-(4-methylfuryl)] and 2-[2-(4-ethylfuryl)]-4,7-dihydro-1,3-dioxepin.

EXAMPLE 2

Preparation of 3-chloromethyl-1,5-dihydro-3,8-dimethyl[1,3]dioxepino[5,6-c]pyridin-9-ol A mixture of 1.28 9. (0.01 m.) of 5-ethoxy-4-methyloxazole, 16.3 g. (0.1 mole) of 2-chloromethyl-4,7-dihydro-2-methyl-1,3-dioxepin, and 1 g. of calcium oxide was stirred under nitrogen at 140–145° C. for 26 hours. The reaction mixture was filtered, and stripped free of unreacted oxazole and dioxepin under reduced pressure. The residue in 50 cc. of glacial acetic acid, after standing at room temperature for 48 hours, was concentrated to 25 cc. and 300 mg. of a white solid, assaying 274 mg. of 3-chloromethyl-1,5-dihydro-3,8-dimethyl[1,3]dioxepino[5,6-c]pyridin-9-ol by U.V., was collected by filtration.

Preparation of 2-haloalkyl-4,7-dihydro-2-methyl-1,3-dioxepins 2-chloromethyl-4,7-dihydro-2-methyl-1,3-dioxepin was prepared by the reaction of 82.5 g. (0.94 mole) of cis-2-butene-1,4-diol and 86.9 g. (0.94 mole) of monochloroacetone in 100 cc. of benzene containing 57 mg. of p-toluenesulfonic acid monohydrate. The reaction mixture was heated at reflux for 18 hours to give 16.5 cc. (98%) of water collected in a Dean-Stark trap. The benzene was removed under reduced pressure and the residue fractionally distilled at 8 mm. to give 128 g. of 2-chloromethyl-4,7-dihydro-2-methyl-1,3-dioxepin boiling at 78–79°.

In a similar manner, when monobromoacetone and chloroethylmethyl ketone are employed, there is obtained respectively 2-bromoethyl - 4,7 - dihydro-2-methyl-1,3-dioxepin and 2-(α-chloroethyl) - 4,7 - dihydro-2-methyl-1,3-dioxepin.

EXAMPLE 3

Preparation of 3-chloromethyl-1,5-dihydro-8-methyl [1,3]dioxepino[5,6-c]pyridin-9-ol A mixture of 1.28 g. (0.01 m.) of 5-ethoxy-4-methyl-oxazole, 14.85 g. (0.1 m.) of 2-chloromethyl-4,7-dihydro-1,3-dioxepin, and 1 g. of calcium oxide is stirred under nitrogen at 135° C. until 70% oxazole conversion is achieved. The reaction mixture is filtered and stripped free of unreacted oxazole and dioxepin at 0.1 mm. The residue in 50 cc. of glacial acetic acid is heated at 50° C. until the maximum 2-chloromethyl-1,5-dihydro-8-methyl [1,3]dioxepino[5,6-c]pyridin-9-ol (U.V.) content is obtained. The acetic acid is removed under reduced pressure and the residue hydrolyzed in 0.1 N hydrochloric acid at 95°. Subsequent concentration of this solution under reduced pressure affords crystalline Vitamin $B_6$ hydrochloride.

Preparation of 2-chloroloweralkyl-4,7-dihydro-1,3-dioxepins

2-Chloromethyl-4,7-dihydro-1,3-dioxepin is prepared as in Example 2 by the reaction of equimolar quantities of cis-2-butene-1,4-diol and chloroacetaldehyde monohydrate in benzene containing a catalytic amount of p-toluenesulfonic acid. After the theoretical amount of water has been collected by azeotropic distillation, the product, 2-chloromethyl-4,7-dihydro-1,3-dioxepin is obtained by fractionation under reduced pressure.

When α-chloropropionaldehyde is reacted with cis-2-butene-1,4-diol there is obtained 2-(α-chloropropyl)-4,7-dihydro-1,3-dioxepin.

EXAMPLE 4

Preparation of Vitamin $B_6$ from 2-methoxymethyl-4,7-dihydro-1,3-dioxepin

In exactly the same manner as Example 3, a mixture of 1.28 g. (0.01 m.) of 5-ethoxy-4-methyloxazole, 14.4 g. (0.1 m.) of 2-methoxymethyl-4,7-dihydro-1,3-dioxepin, and 1 g. of calcium oxide affords crystalline Vitamin $B_6$.

In the same manner as Example 3, 2-methoxymethyl-4,7-dihydro-1,3-dioxepin is afforded from the reaction of methoxyacetaldehyde with cis-2-butene-1,4-diol.

EXAMPLE 5

A mixture of (1.0 mole) of 4-methyl-5-ethoxyoxazole, (3.0 moles) of 2-ethoxymethyl-4,7-dihydro-1,3-dioxepin, and 65.5 g. of powdered calcium oxide is heated with stirring at 125° C. for 40 hours in a closed flask. After cooling, the calcium oxide is filtered off and residual oxazole and dienophile distilled out at 2 mm. Hg pressure to a pot temperature of 130° C. The residue is distilled in a short path molecular still at 100° C. and a pressure of 0.2 mm. Hg. After further purification by distillation, and further treatment with 50 ml. of glacial acetic acid, there is obtained 3-ethoxymethyl-1,5-dihydro-8-methyl[1,3]dioxepino[5,6c]pyridin-9-ol.

EXAMPLE 6

Preparation of Vitamin B from 2-methoxyethyl-4,7-dihydro-1,3-dioxepin

A mixture of .010 mole of 5-ethoxy-4-methyloxazole and 0.06 mole of 2-methoxymethyl-4,7-dihydro-1,3-dioxepin is sealed in a glass tube and heated in an oil bath at 140° C. for 20 hours. The resulting reaction mixture is removed from the cooled tube, diluted to 100 ml. with methanol, then to 600 ml. with 0.1 N aqueous hydrochloric acid and refluxed for 2 hours. The solution is concentrated under reduced pressure, first on a water aspirator, subsequently on an oil pump at 1.5 mm. Hg pressure to a weight of about 4 gm. The resulting residual is diluted with 5 ml. of absolute ethanol and acidified with an additional 5 ml. of 10 M ethanolic hydrogen chloride. On standing at 5° C. overnight, Vitamin $B_6$ hydrochloride crystallizes out and is recovered by filtration.

EXAMPLE 7

Preparation of Vitamin $B_6$ from 2-chloromethyl-4,7-dihydro-2-methyl-1,3-dioxepin A mixture of 1.273 g. (0.01 mole) of 5-ethoxy-4-methyloxazole, 24.38 g. of 2-chloromethyl-4,7-dihydro-2-methyl-1,3-dioxepin, and 2.51 g. of calcium oxide was sealed under nitrogen and heated at 130° C. for 66.25 hours. The reaction mass, which was shown to contain 47% of the oxazole charged by gas liquid partition chromatography, was filtered and stripped free of unreacted oxazole and dioxepin at 0.1 mm. The residue in 40 cc. of acetic acid was heated at 55° C. for 2 hours to give 3-chloromethyl-1,5-dihydro-3,8-dimethyl[1,3]dioxepino[5,6c]pyridin-9-ol. A 1 cc. aliquot of the reaction solution was diluted with 10 cc. of 0.1 N hydrochloric acid and heated to 95° C. for 4 hours to give pyridoxine.

We claim:
1. A compound of the formula

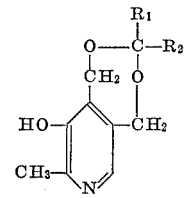

wherein $R_1$ represents hydrogen or methyl and $R_2$ represents furyl, thiazolyl, chloroloweralkyl or loweralkoxy loweralkyl.

2. A compound of claim 1 wherein $R_1$ represents hydrogen or methyl and $R_2$ represents chloromethyl or methoxymethyl.

References Cited

UNITED STATES PATENTS 3,250,778    5/1966    Kimel et al. _____ 260—297

HENRY R. JILES, Primary Examiner

A. L. ROTMAN, Assistant Examiner

U.S. Cl. X.R.

260—297, 297.5, 302, 338, 307; 424—263